United States Patent
Chuang

(10) Patent No.: US 11,007,612 B2
(45) Date of Patent: May 18, 2021

(54) PUSHING STRUCTURE OF CLAMPING MECHANISM

(71) Applicant: Hsu-Pin Chuang, Tainan (TW)

(72) Inventor: Hsu-Pin Chuang, Tainan (TW)

( * ) Notice: Subject to any disclaimer, the term of this patent is extended or adjusted under 35 U.S.C. 154(b) by 0 days.

(21) Appl. No.: 16/430,703

(22) Filed: Jun. 4, 2019

(65) Prior Publication Data

US 2020/0384589 A1 Dec. 10, 2020

(51) Int. Cl.
  *B23B 31/107* (2006.01)
  *B23Q 1/00* (2006.01)
  *B23B 31/30* (2006.01)

(52) U.S. Cl.
  CPC ........ *B23Q 1/0072* (2013.01); *B23B 31/1071* (2013.01); *B23B 31/302* (2013.01)

(58) Field of Classification Search
  CPC ..... B23Q 1/0072; B23B 31/302; B23B 31/22; B23B 31/1071; B23B 31/107; Y10T 279/1291; Y10T 279/17752; Y10T 279/17811
  See application file for complete search history.

(56) References Cited

U.S. PATENT DOCUMENTS

| | | | | |
|---|---|---|---|---|
| 6,273,434 B1* | 8/2001 | Stark | ................... | B23B 31/1071 |
| | | | | 269/309 |
| 6,860,477 B2* | 3/2005 | Etter | ................... | B23Q 1/0072 |
| | | | | 269/309 |
| 6,997,448 B2* | 2/2006 | Roth | ................... | B23Q 1/0072 |
| | | | | 269/309 |
| 7,219,886 B2* | 5/2007 | Etter | ................... | B23Q 1/0072 |
| | | | | 269/309 |
| 9,827,615 B2* | 11/2017 | Chuang | ................ | B23Q 1/0072 |
| 2004/0051225 A1* | 3/2004 | Etter | ................... | B23Q 1/0072 |
| | | | | 269/309 |
| 2017/0165801 A1* | 6/2017 | Chuang | ................ | B23Q 1/0072 |

FOREIGN PATENT DOCUMENTS

| | | | | |
|---|---|---|---|---|
| DE | 10116229 A1 * | 10/2002 | ........... | B23Q 1/0072 |
| DE | 10331423 A1 * | 2/2005 | ......... | B23B 31/1071 |
| DE | 102004020228 A1 * | 11/2005 | ......... | B23B 31/1071 |
| DE | 102007031463 A1 * | 1/2009 | ......... | B23Q 1/0072 |
| EP | 1175959 A2 * | 1/2002 | ........... | B23Q 1/0072 |
| EP | 1264658 A2 * | 12/2002 | ............ | B23Q 16/00 |
| TW | I580514 B | 5/2017 | | |

* cited by examiner

*Primary Examiner* — Eric A. Gates
*Assistant Examiner* — Paul M Janeski
(74) *Attorney, Agent, or Firm* — Rosenberg, Klein & Lee

(57) ABSTRACT

A pushing structure of a clamping mechanism is disclosed which comprises a working platform and a chuck. The working platform has a clamping shaft inserted in the chuck, and the chuck has a piston seat and a movable seat at a center of the piston seat for an insertion of the clamping shaft. The chuck further comprises a base at a bottom of the piston seat corresponding to the movable seat and a projection at a bottom of the base. The projection provides an upward push force to the working platform when the piston seat is lifted to release the clamping shaft of the working platform.

4 Claims, 3 Drawing Sheets

PUSHING STRUCTURE OF CLAMPING MECHANISM

BACKGROUND OF THE INVENTION

1. Field of the Invention

The present invention relates to a pushing structure of a clamping mechanism which assists in separating a working platform from a chuck smoothly without generating noise.

2. Description of Related Art

It is important to clamp a carrier carrying a workpiece at a correct position on a chuck or release fully from the chuck of a clamping mechanism in semi-automatic machining process or fully automatic machining process. If the carrier is not positioned and fixed correctly, the workpiece will shift during the machining process which is dangerous and leading to an inaccurate size and a deviation precision of the workpiece after the machining process, and may cause an extremely serious damage.

For instance, a floating-type clamping mechanism is disclosed by the Taiwan Pat. No. TW I580514(B), issued on 1 May 2017. The floating-type clamping mechanism comprises a working table having a clamping rod and a chuck which released or clamped the clamping rod of the working table. The chuck comprises a base having an accommodation chamber in a center, a top seat fixed at an opening of the base, a piston seat disposed in the accommodation chamber, plural elastic members disposed annularly between the piston seat and the top seat for top bracing the piston seat, and a movable seat disposed in a middle of the piston seat. The movable seat has an annular inclined surface at a top region outside thereof and is limited at an opening of the top seat, and plural clamping member disposed around the movable seat and moving horizontally. The piston seat is further provided with a base. Accordingly, the clamping rod of the working table is inserted into the movable seat and the plural clamping members are moved inwardly to clamp the clamping rod. At the same time, the movable seat is floated upwardly, and then is inwardly pushed down by an interaction of the annular inclined surface and the opening of the top seat for inwardly pressing and stably clamping the clamping rod, and an effect of zero-point clamping by the working table and the chuck is achieved.

According to the abovementioned structure, a stably clamping effect is provided after clamping a workpiece for a machining process, and the clamping rod of the working table is released after the machining process. After the machining process, a pressure is imported to push the piston seat upwardly for releasing the clamping status, and the clamping rod of the working table is separated from the plural clamping members around the movable seat. When a working table and a chuck are clamped to each other of a conventional clamping mechanism, a vacuum fitting state is formed therebetween due to a completely adhering by two corresponding end surfaces of the working table and the chuck. Therefore, when the piston seat is upwardly pushed for releasing the clamping status, a noise is generated due to separate an adsorption of the working table and the chuck which is not totally satisfying in use.

SUMMARY OF THE INVENTION

The present invention relates to a pushing structure of a clamping mechanism which assists in separating a working platform from a chuck smoothly without generating noise.

The main purpose and effects of a pushing structure of a clamping mechanism of the present invention is achieved by the following technical means:

A clamping shaft of a working platform of the present invention is inserted into a chuck for fixing. To release the clamping shaft, a piston seat is upwardly pushed and a pushing force provided by a projection is applied to a bottom of the clamping shaft for smoothly separating the working platform from an end surface of the chuck closely adhered to the working platform, so the working platform can be separating from the chuck smoothly without generating noise.

In addition, an ejector required power is not needed for the present invention since the piston seat of the present invention can be pushed up to eject the working platform. Therefore, the present invention achieves an ejection effect by a simple structure which lowers production cost effectively and is economical.

DETAILED DESCRIPTION OF THE PREFERRED EMBODIMENT

Figure 1:
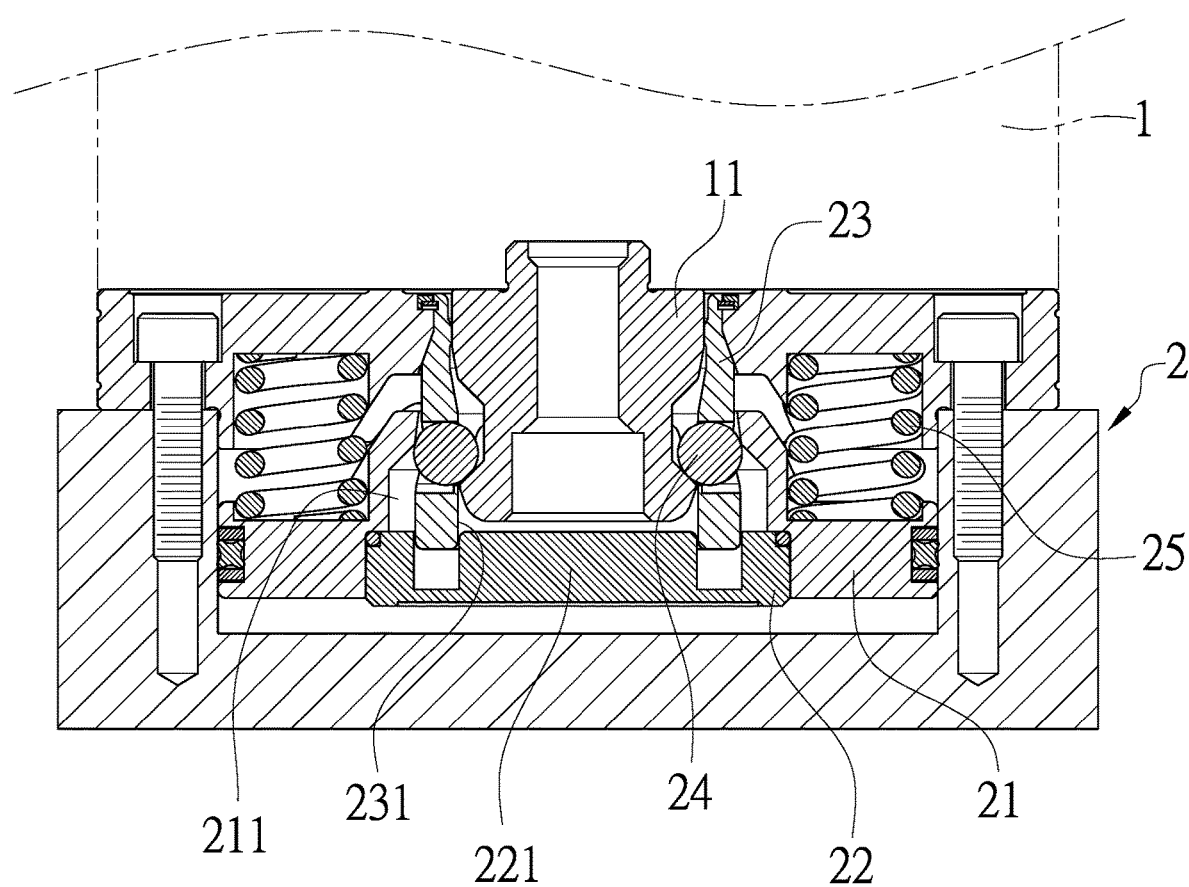
FIG. 1 is a sectional view showing a pushing structure of a clamping mechanism according to a first embodiment of the present invention in a clamping state.
Figure 2:
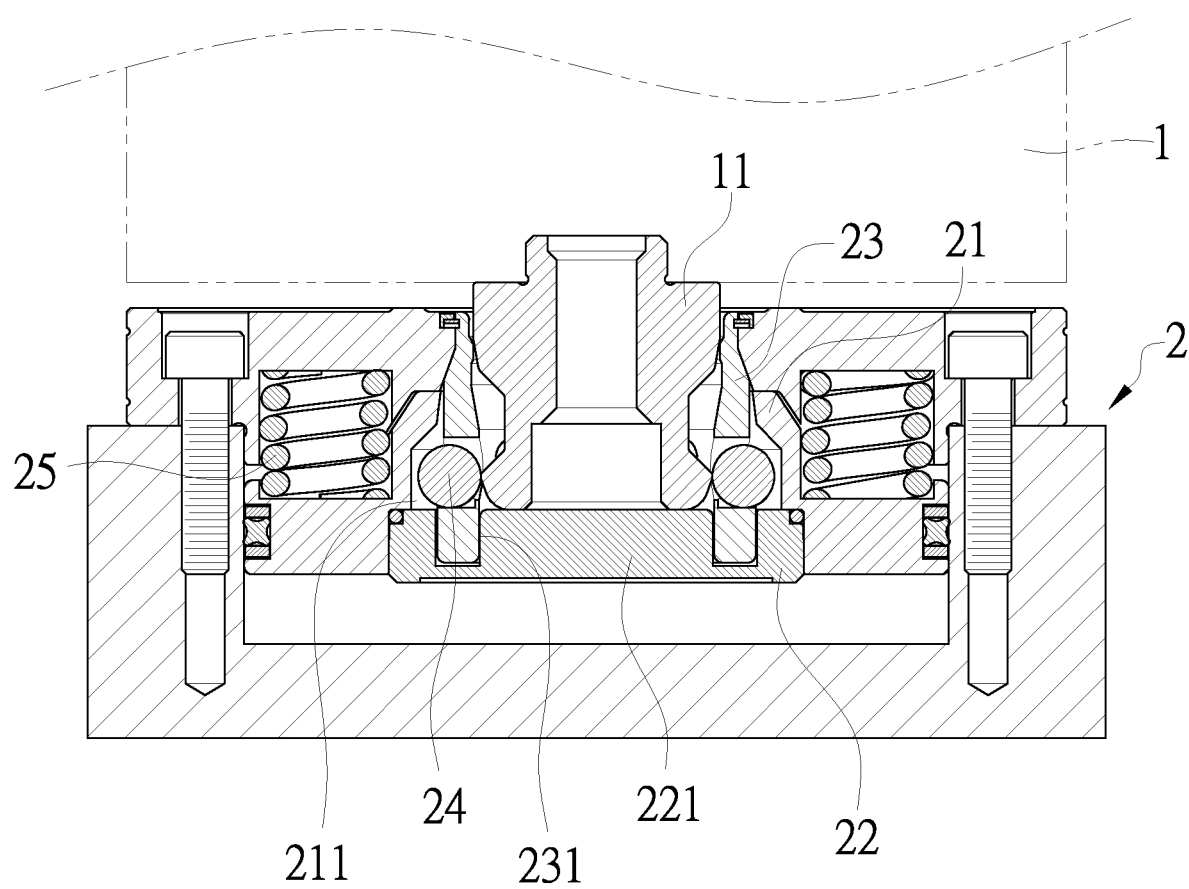
FIG. 2 is a sectional view showing a pushing structure of a clamping mechanism according to the first embodiment of the present invention in a release state.
Figure 3:
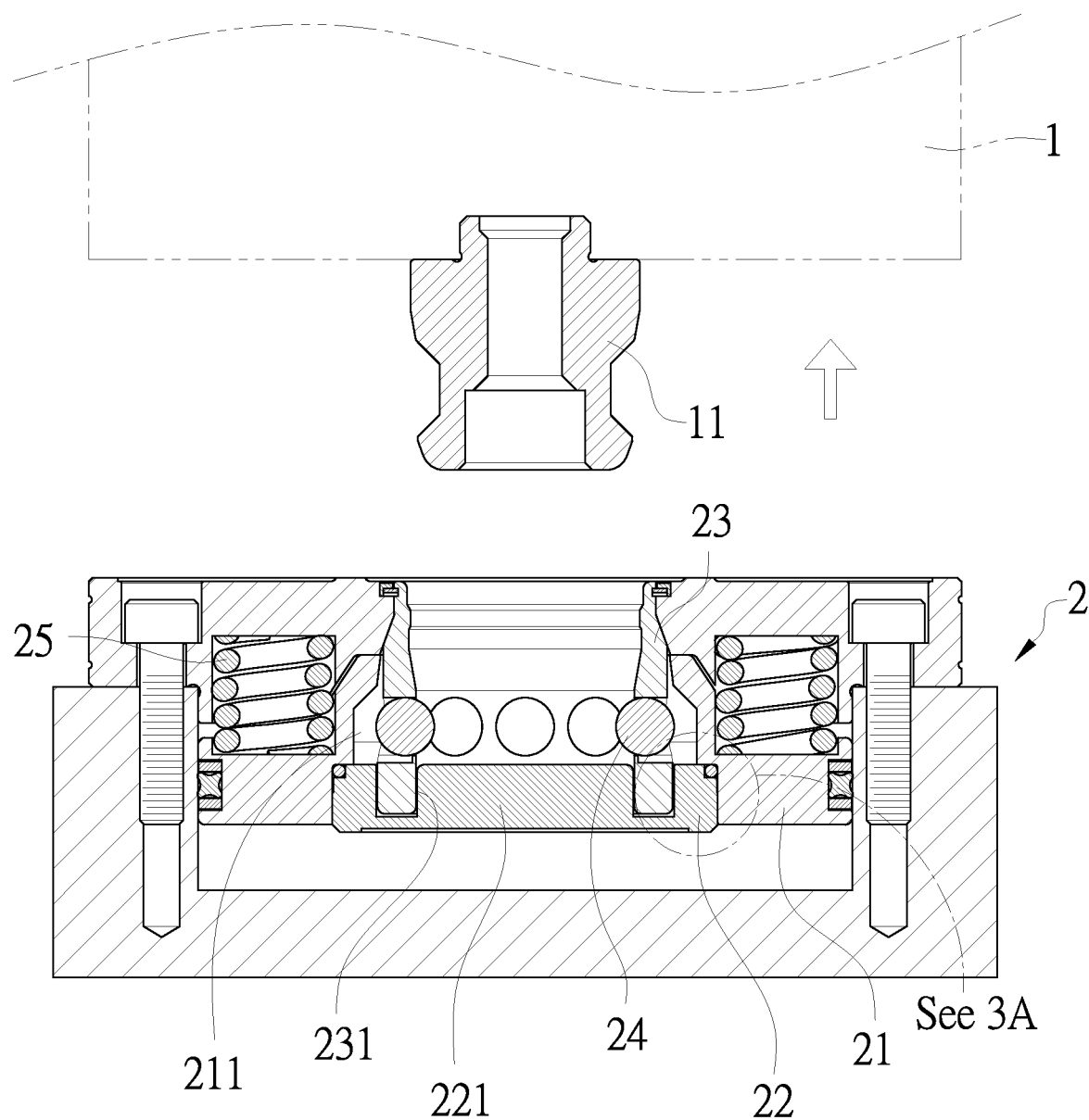
FIG. 3 is a sectional view showing a working platform detached from a chuck according to the first embodiment of the present invention in a separated state.

Referring to FIG. 1 to FIG. 3, a pushing structure of a clamping mechanism of the present invention comprises a working platform (1) having a clamping shaft (11) at a bottom of the working platform (1) and a chuck (2) for receiving the clamping shaft (11). The chuck (2) has a piston seat (21), a base (22), a movable seat (23), plural clamping members (24) and plural elastic members (25). The piston seat (21) is disposed in the chuck (2) and having a first through hole (211) in a middle of the piston seat (21). The base (22) is disposed at a bottom of the piston seat (21) for sealing the first through hole (211). The movable seat (23) is disposed in the first through hole (211) for an insertion of the clamping shaft (11) in a middle of the movable seat (23). The plural clamping members (24) are disposed around the movable seat (23) for clamping and fixing the clamping shaft (11). The plural elastic members (25) are disposed around the piston seat (21) for driving the piston seat (21) up and down to release and clamp the clamping shaft (11) of the working platform (1) respectively.

The movable seat (23) further has a second through hole (231) at a middle bottom thereof, and the base (22) has a projection (221) corresponding to the second through hole (231) for upwardly pushing the clamping shaft (11).

Referring to FIG. 1 to FIG. 3, the plural clamping members (24) are sliding blocks or rolling balls, and the plural rolling balls are represented in the following embodiment. The piston seat (21) is first pushed into an interior space of the chuck (2) by a power, for example, by a power generated from a hydraulic oil pressure system, when the working platform (1) is not assembled with the chuck (2), and the piston seat (21) is in a top bracing state. To inset the clamping shaft (11) of the working platform (1) into the chuck (2), the power in the chuck (2) is removed and the elastic members (25) disposed around the piston seat (21) can be stretched to push the piston seat (21) downwardly by its elasticity. After the piston seat (21) is pushed downwardly, the clamping members (24) are pushed toward a center of the chuck (2) and engaged with the clamping shaft (11), so the movable seat (23) can be moved down for holding the clamping shaft (11) firmly. At the same time, a bottom surface of the working platform (1) is closely attached to a top surface of the chuck (2) to achieve an effect of zero-point clamping of the working platform (1) and the chuck (2).

To separate the working platform (1) from the chuck (2) after machining process, a power is imported into the interior space of the chuck (2) to lift the piston seat (21) and compress the elastic members (25), and the movable seat (23) is slightly pushed upwardly. The clamping members (24) are then moved outwardly to release the clamping shaft (11). Simultaneously, the base (22) is driven to move upwardly by the piston seat (21) lifted and the projection (221) of the base (22) pushes the clamping shaft (11) to separate the bottom surface of the working platform (1) from the top surface of the chuck (2). Therefore, the closely attached state between the working platform (1) and the chuck (2) is released and the working platform (1) is detached from the chuck (2) smoothly.

Figure 3A:
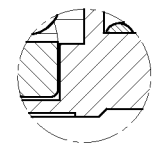
FIG. 3A is a partial sectional view showing parts of an integrally formed piston seat and base as part of a second embodiment of the present invention.

Besides, the piston seat (21) and the base (22) are two separated components as described above and are synchronous linked, as illustrated in, for example, FIG. 3, or the piston seat (21) and the base (22) are integrally formed, as illustrated in FIG. 3A.

According to the description above, the present invention has advantages as follows:

1. The working platform of the present invention is detached from a top surface of the chuck smoothly by pushing a bottom surface of the clamping shaft with a projection of the base when the piston seat is lifting, so the working platform can separate from the chuck smoothly without generating noise.

2. The projection of the base of the present invention is moved upwardly together with the lifted piston seat, and an ejector required power is not needed for the present invention. Therefore, the present invention achieves an ejection effect by a simple structure which lowers production cost effectively and is economical.

What is claimed is:

1. A pushing structure of a clamping mechanism, comprising:
a working platform having a clamping shaft at a bottom thereof; and
a chuck for receiving the clamping shaft, the chuck including:
a piston seat defining a hole in a middle thereof,
a base disposed at a bottom of the piston seat for sealing one end of the hole, the base being fixed relative to the piston seat to move therewith,
a seat for engaging the clamping shaft, the seat being disposed in the hole of the piston seat for insertion of the clamping shaft in a middle thereof,
a plurality of clamping members disposed around the seat for clamping and fixing the clamping shaft, and
a plurality of elastic members disposed around the piston seat for driving the piston seat up and down to release and clamp the clamping shaft of the working platform respectively,
wherein the seat has a through hole at a middle bottom thereof, and
wherein the base has a projection corresponding to the through hole for displaceable insertion therein to push against the clamping shaft and to eject the clamping shaft from the through hole.

2. The pushing structure of a clamping mechanism as claimed in claim 1, wherein the piston seat and the base are integrally formed.

3. The pushing structure of a clamping mechanism as claimed in claim 1, wherein the base is formed with a groove about the projection for receiving a lower portion of the seat.

4. The pushing structure of a clamping mechanism as claimed in claim 1, wherein the piston seat and the base are synchronously linked separate components.

\* \* \* \* \*